No. 780,436. PATENTED JAN. 17, 1905.
G. D. MUNSING.
RIM FOR VEHICLE WHEELS.
APPLICATION FILED AUG. 11, 1904.

Witnesses:

Inventor:
George D. Munsing
by Henry Orth Jr.
Atty.

No. 780,436.

Patented January 17, 1905.

UNITED STATES PATENT OFFICE.

GEORGE D. MUNSING, OF NEW YORK, N. Y.

RIM FOR VEHICLE-WHEELS.

SPECIFICATION forming part of Letters Patent No. 780,436, dated January 17, 1905.

Original application filed July 21, 1904, Serial No. 217,515. Divided and this application filed August 11, 1904. Serial No. 220,390.

*To all whom it may concern:*

Be it known that I, GEORGE D. MUNSING, a citizen of the United States, residing at the city of New York, county and State of New York, have invented certain new and useful Improvements in Rims for Vehicle-Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to split rims for vehicle-wheels, and more particularly to the rims of wheels for automobiles and touring-cars, being a division of my application Serial No. 217,515, filed July 21, 1904.

Figure 1:
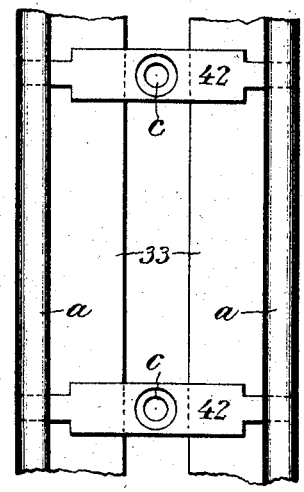
Figure 2:
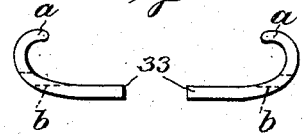
Figure 3:
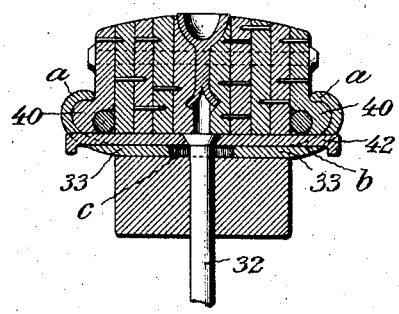

Referring to the drawings, in which like parts are similarly designated, Figure 1 is a top view of part of the rim. Fig. 2 is a section. Fig. 3 is a section showing the tire held in the rim.

The rim, preferably of metal, is divided peripherally into two portions 33, each portion having a flange $a$ that is preferably overturned, and through the rim are slots or other perforations $b$ oppositely situated and preferably but not necessarily at regular intervals around the circumference. Through the oppositely-situated slots $b$ are passed the ends of metal pieces 42, the extremities of which are bent down, as shown in Fig. 3, to hold the tire clamped in place. In the metal uniting member 42 is a perforation $c$, preferably but not necessarily reamed conical to receive the head of a bolt 32 that fastens the rim to the felly of the wheel.

The tire, here shown as a laminated one, is provided with beads 40, engaged by the overturned flanges $a$ on the split rim. The two portions of the rim with the uniting members 42 inserted in slots $b$ are forcibly pressed together, and the ends of said members projecting through the slots on the outside of the rim are bent over, thus securely holding the tire in place.

Instead of having the heads of bolts 32 entering countersunk holes $c$ these holes can be threaded to receive the end of a threaded shank of the bore that holds the rim and felly together.

Having thus described my invention, what I claim as new therein, and desire to secure by Letters Patent, is—

1. In a vehicle-wheel, a two-part rim and means to hold the parts together independent of the felly of the wheel, and means independent of the rim to secure the rim to the felly, substantially as described.

2. In a vehicle-wheel, the combination with the felly, of a two-part rim having a flat base and upturned flanges, means to unite the parts of the rim to hold the tire in place and devices passing through said means and felly to secure the rim to the felly of the wheel, substantially as described.

3. In a vehicle-wheel, a two-part rim, each part having a flat base and an upturned flange, metallic plates each passing through the flanges of the two rim portions and means cooperating with said plates to secure the rim to the felly of the wheel, substantially as described.

4. In a vehicle-wheel, the combination with the felly, of a rim having upturned edges and divided centrally, a tire, means to lock the two parts of the rim together and to the tire, and bolts passing through said means to secure it to the felly, substantially as described.

5. In a vehicle-wheel, the combination with the felly, of a rim having upturned edges and divided centrally, a tire having a bead on each side to be engaged by the upturned edges of the rim, plates each passing through the two portions of the rim and bolts passing through said plates and between the proximate edges of the portions to secure the rim to the felly, substantially as described.

In testimony that I claim the foregoing as my invention I have signed my name in presence of two subscribing witnesses.

GEORGE D. MUNSING.

Witnesses:
A. W. CHATFIELD,
JOSEPH J. SMITH.